US010698889B2

(12) United States Patent
Kevorkian

(10) Patent No.: US 10,698,889 B2
(45) Date of Patent: Jun. 30, 2020

(54) BULK PROCESSING OF CUSTOM OBJECT PROPERTIES

(71) Applicant: SAP SE, Walldorf (DE)

(72) Inventor: Gabriel Kevorkian, Suresnes (FR)

(73) Assignee: SAP SE, Walldorf (DE)

(*) Notice: Subject to any disclaimer, the term of this patent is extended or adjusted under 35 U.S.C. 154(b) by 712 days.

(21) Appl. No.: 15/092,045

(22) Filed: Apr. 6, 2016

(65) Prior Publication Data

US 2017/0293652 A1 Oct. 12, 2017

(51) Int. Cl.
*G06F 16/2453* (2019.01)
*G06F 16/22* (2019.01)
*G06F 16/28* (2019.01)

(52) U.S. Cl.
CPC ........ *G06F 16/2453* (2019.01); *G06F 16/221* (2019.01); *G06F 16/289* (2019.01)

(58) Field of Classification Search
CPC ......... G06F 17/30442; G06F 17/30315; G06F 17/30607; G06F 16/2453; G06F 16/289; G06F 16/221
USPC ........................................................ 707/713
See application file for complete search history.

(56) References Cited

U.S. PATENT DOCUMENTS

| | | | | |
|---|---|---|---|---|
| 8,171,046 | B1* | 5/2012 | Joyce | G06F 16/258 707/769 |
| 8,612,468 | B2* | 12/2013 | Schloming | G06F 17/30595 707/763 |
| 2004/0015496 | A1* | 1/2004 | Anonsen | G06F 16/289 |
| 2008/0189240 | A1* | 8/2008 | Mullins | G06F 17/30557 |
| 2009/0006463 | A1* | 1/2009 | Mehra | G06F 17/30557 |

* cited by examiner

*Primary Examiner* — Kimberly L Wilson
(74) *Attorney, Agent, or Firm* — Sterne, Kessler, Goldstein & Fox P.L.L.C.

(57) ABSTRACT

Disclosed herein are system, method, and computer program product embodiments for bulk processing of custom object properties. An embodiment operates by receiving a query on one or more properties of an object class. A column of a database table is determined to correspond to a field of the object class. A set of data is collected from the determined column. The collected data of the determined column corresponding to each of the plurality of instances is converted by executing the one or more operations on the data set. A result set including the converted data as it corresponds to the plurality of instances associated with the query is provided.

17 Claims, 4 Drawing Sheets

FIG. 2A

| | Col 105A | Col 105B | Col 105C |
|---|---|---|---|
| Object_1 | 1 | C001 | Text... |
| Object_2 | 2 | C002 | Text... |
| | | | |
| | | | |
| | | | |
| | | | |
| Object_n | n | C00<n> | ... |

| | Col 105A | Col 105B | Col 105C |
|---|---|---|---|
| Object_1 | 1 | C001 | Text... |
| Object_2 | 2 | C002 | Text... |
| | | | |
| | | | |
| | | | |
| | | | |
| Object_n | n | C00<n> | ... |

104, 210A, 230

US 10,698,889 B2

BULK PROCESSING OF CUSTOM OBJECT PROPERTIES

BACKGROUND

Generally, databases are used to store data that support a variety of different systems. However, not all data is created equal; simple data, such as integer data, lends itself to easy storage in a database, while more complex data, such as data of an object class from an object-oriented environment (OOE), may require additional processing to convert the data between the OOE and the database. This additional processing may require additional resources and time and could result in significant delays, particularly when queries are executed against the data in the database.

BRIEF DESCRIPTION OF THE DRAWINGS

The accompanying drawings are incorporated herein and form a part of the specification.

FIG. 2A is an example of how query processing is performed without the use of a batch processor, according to an embodiment.

FIG. 2B is an example of how query processing is performed with the use of a batch processor, according to an embodiment.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for bulk processing of custom object properties.

Figure 1:
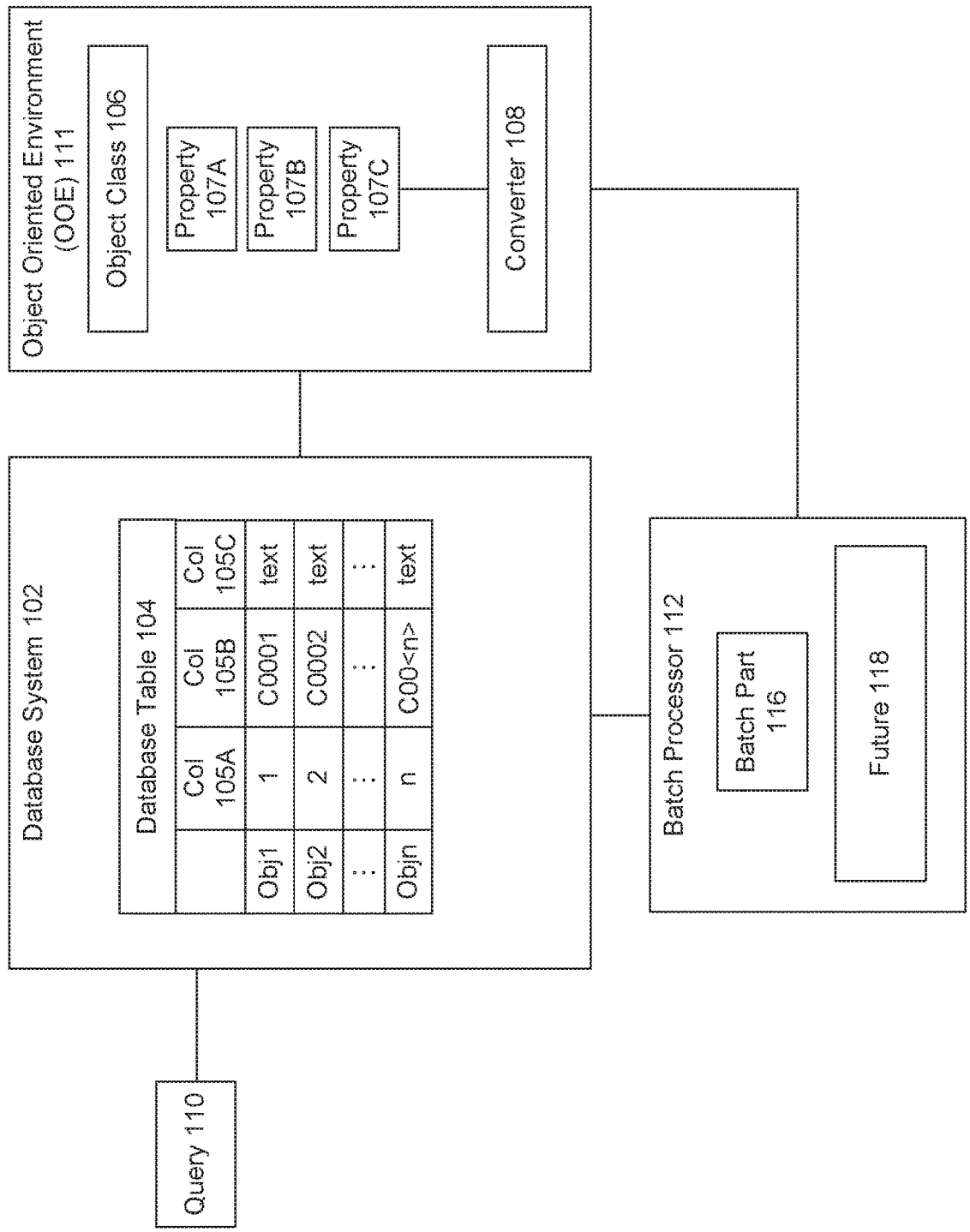
FIG. 1 is a block diagram of a database system that includes bulk processing of custom object properties, according to an example embodiment.

FIG. 1 is a block diagram of a database system 102 that includes the bulk processing of custom object properties, according to an example embodiment. The database system 102 includes a database table 104 that stores data across multiple instances of an object class 106. In an embodiment, database system 102 may be a relational database system.

In an embodiment, database table 104 may include columns 105A-105C that store values for properties 107A-107C, respectively, of object class 106. In an embodiment, object class 106 may be a customized, application-specific, or programmer defined data structure that is defined in an object oriented programming environment (OOE) 111, and may be reusable across different programs. OOE 111 may include any programming language environment that uses custom-built or application or program specific data structures, such as objects (e.g., object classes 106) to store or manage information. Example OOE programming languages include, but are not limited to C++ and Java.

Object class 106 may be a custom, application-specific, or otherwise non-standardized data structure that may be used to store particular information related to the class or object being defined. Object class 106 may include different variables, fields, or properties 107 which are used to store or define data of the object. Each property 107 may include a standardized or scalar value-type such as integers, text, Boolean, or real numbers which may be stored directly in database table 104. Or the properties 107 may include non-standardized or non-scalar values, such as long text (that occupies more than one row in database table 104) or other object classes 106, for which a mapping or conversion process (e.g., as implemented by a converter 108) may be required to store the corresponding data in database table 104. Object class 106 may also include one or more methods by which the values of properties 107 may be accessed, calculated, or edited.

In the example shown, properties 107A and 107B may be scalar values such as integers, short strings, Boolean, or another specified data type. The values of property 107A and property 107B may be stored directly in database table 104 without any additional processing, mapping, or conversion. Property 107C, by contrast, may be a non-scalar value such as a long string (e.g., unable to fit within a single row/column portion of database), another object class 106, or another value or set of values that cannot be directly stored in database table 104.

In order to store the non-scalar value of property 107C in database table 104, the value of property 107C may need to be converted or mapped using converter 108. Converter 108 may convert the data or values stored in one or more columns 105C (and/or rows) into the corresponding values of one or more properties 107 of object class 106. In an embodiment, the values used for a particular property 107C or object may be stored across multiple columns, rows, or tables 104 of database system.

The values stored in database 104 may be scalar values in an embodiment. As such, non-scalar values such as property 107C may require converter 108 to perform translations, calculations, or conversions between database table 104 and OOE 111. Converter 108 may perform one or more logic or other operations to convert the values between OOE 111 and the database system 102. Example operations by converter may include arithmetic operations, dividing or combining multiple values, and logic operations. In an embodiment, converter 108 may call one or more methods of an object class 106 during the conversion process.

Database table 104 may include the values of properties 107A-C stored across columns 105A-C (which may include storage across multiple tables 104) for each of a plurality of instances of the object class 106 (as shown in different rows Object 1 . . . Object N). Database system 102 may receive a query 110 on the properties 107 of object class 106, which may include data or values stored in database table 104 for different instances of object class 106. Query 110 may include one or more conditions to be evaluated against properties 107 for which corresponding data is stored in database system 102, to determine which rows or object instances satisfy the query conditions or parameters. To process query 110, values may need to retrieve the data from one or more database tables 104 for each object instance that is to be processed in accordance with query 110 and convert the data (if necessary) into the corresponding property 107 value(s) (e.g., such as converting data of column 105C for the value of property 107C).

Converter 108 may be an object method, defined within OOE 111, that is configured to operate on an instance-by-instance basis. As such, in a first instance-by-instance approach to evaluating query 110, multiple separate database table 104 accesses, query evaluations, and calls to converter 108 may be required to be synchronously performed.

In an embodiment, converter 108 may perform one or more database queries 110. For example, when query 110 is received, converter 108 may determine which columns 105 and/or rows of one or more database tables 104 correspond to query 110. Converter 108 may then fetch the data or values from database system 102, and perform the conversion of values into the properties 107C for which conversion may be necessary. In an embodiment, as described herein, the data stored as column 105C is not self-sufficient, it is merely a reference (typically an integer key) to data stored elsewhere (potentially spread across a number of "auxiliary" tables 104).

In an embodiment the actual data or values corresponding to object instances may be stored across multiple or separate tables 104. For example, a first table 104 may have two columns, 105D and 105E as shown below.

|      | Coln105D | Coln105E |
|------|----------|----------|
| Obj1 | 10       | 7        |
| Obj2 | 8        | 1        |

A second table 104 may include text values. For example, the text table may appears as follows:

| TextId | TextValue |
|--------|-----------|
| 1      | Some text |
| 2      | Another text |
| 3      | ... |
| 7      | A very very very very |
| 7      | very long text that cannot fit that cannot fit |
| 7      | on a single row |
| 8      | a short text |
| 10     | a short description |

The values of the text table retrieved for Coln105D and Coln105E of Obj1 may be "a short description" and "A very very very very very long text that cannot fit that cannot fit on a single row" (note that this value is spread across multiple rows in the text table), respectively. In an embodiment, the same converter 108 may be used both for properties 107C and 107D mapped to columns 105C and 105D respectively. Though this example is related to long textual values, the embodiment may apply to other value types/representations as well.

Converter 108 enables the non-trivial mapping of object class 106 onto multiple database tables (non-trivial in the sense that it may not be accomplished or performed with a standard SQL JOIN but may require performing a number of additional SQL queries and doing extra in-memory processing) while at the same time keeping the number of database queries 110 constant (independent of the number of objects, object instances, or properties 107 for which values are being fetched/converted).

In an embodiment, for each row (instance) of database table 104 for which column 105C is retrieved, a separate call to converter 108 may be required because converter 108 operates at an object instance level. This may require multiple queries 110 to be performed, one for each row or instance in database table 104 in order to process non-scalar values such as property 107C which may be stored across one or more columns (e.g., 105C) of one or more database tables 104 (see FIG. 2A, described in greater detail below).

For example, if N=5, then five separate database accesses, conversions, and query evaluations would be necessary to retrieve data from database table 104, convert the data with converter 108, and evaluate the converted data against query 110.

This multiple query or per-instance processing approach requires multiple reads or other accesses to database table 104, and multiple converter 108 calls. Each such database access or call however may have its own processing overhead, and executing multiple queries may require additional time and/or other processing resources to execute. Processing the values of column 105C on a row-by-row or instance-by-instance basis is inefficient in part because it requires multiple database accesses, whereby each database access may include its own additional overhead.

As noted above, database table 104 may include data or values stored for a plurality of instances of object class 106, as shown in the first column Obj1, Obj 2 . . . Obj N. Batch processor 112 may reduce the runtime of query processing (e.g., relative to the first approach) by limiting the number of database accesses (e.g., reads or writes) by processing query 110 as a single query (or fewer or a constant number of queries) against a data set including data across multiple instances of object class 106 (e.g., rows) to be processed for query 110.

In an embodiment, batch processor 112 may extend or expand on the functionality of converter 108. As noted above, converter 108 may operate on an instance-by-instance basis. For example, converter 108 may receive a parameter of data from table for a single instance of object class 106 (e.g., the text of column 105C for Obj 1) and return the corresponding value of property 107C for Obj 1.

Batch processor 112, however, may include an alternative, additional, or expanded definition of converter 108 that receives a set of data (across multiple object instances) and a function call (e.g., converter 108). Then, for example, batch processor 112 may execute the conversion process against the entire set of data and return a result set or future value 118 that includes the corresponding property 107 values for object class 106. For example, batch processor 112 may receive data from column 105C across all N object instances, and return values for property 107C for each of the N instances as future 118.

As such, in an embodiment, rather than returning the processing result (e.g., property 107C value) of each object instance, batch processor 112 may collect the scalar data from database table 104 (e.g., of column 105C) and return the corresponding to non-scalar values 107C, by executing converter 108 against the data set. In an embodiment, converter 108 may be integrated within batch processor 112 and may perform the fetch and conversion operations on behalf of batch processor 112 in manner described herein.

The data collected from database table 104 may be stored as batch part 116. In an embodiment, rather than executing multiple reads or database 104 accesses, batch processor 112 may retrieve data across multiple object instances (associated with query 110) and store this data as batch part 116. Once the batch part 116 data has been collected, batch processor may convert the batch part 116 data based on the one or more operations of converter 108. In an embodiment, batch processor may receive batch part 116 and converter 108 as parameters and return future 118 when the processing, conversation, or calculations are complete on the set of provided data (e.g., across the object instances). In an embodiment, no values may be returned by batch processor 112 until a plurality of object instances have been processed.

In an embodiment, future 118 may be a construct that acts as a proxy for a result that is initially unknown because the computation is incomplete. For example, future 118 may be a data structure used to store values across the object instances (as those values correspond to one or more properties 107) that correspond to or satisfy the condition(s) of query 110. Batch processor 112 may use future 118 to collect and processing of multiple data values prior to returning the result set corresponding to query 110. Batch processor 112 may perform the processing either sequentially or in parallel (e.g., using multiple threads), and return a single result set across the different instances.

In an embodiment, a single batch part 116 may be or include values collected on a per-instance request or basis (e.g., for each object class 106 instance associated with query 110). However, batch processor 112 may delay the execution of each object class 106 instance or conversion of data from table 104 into one more property values 107 by using future 118. Rather than calculating or determining property 107C value for each object class 106 instance individually, batch processor 112 may perform the processing for a group of batch parts 116.

In an embodiment, batch part 116 and future 118 may be a single object utilized by batch processor 112 (even though shown in the example as two different boxes). For example, batch part 116 may be an augmented version of future 118 that may enable a delayed retrieval or calculation of property 107C to be included in future 118. This may be a function of converter 108 operating in an asynchronous mode as used by batch processor 112.

In an embodiment, batch processor 112 may operate asynchronously (e.g., using an asynchronous converter 108). For example, the actual querying and derivation of object property values 107 may be delayed to a later stage (e.g., until multiple values are collected for different object instances from one or more database tables 104).

As noted above, converter 108 may include a mapping between one or more properties 107 and one or more values stored across one or more tables 104. Based on the mapping, the data values from tables 104 may be retrieved and converted into the corresponding property values 107 for one or more object class 106 instances.

In a first step, batch processor 112 may determine the intent to retrieve a number of properties 107 on a number of objects (e.g., via particular batch processor 112 call in an application program). A data operation of one or more asynchronous converters 108 may define a context for the mapping that allows for queuing requests for batch processor(s) 112, so that batch processor 112 may perform bulk processing rather than processing on an instance-by-instance basis.

For example, batch processor 112 may call asynchronous converter 108 by passing two parameters to converter 108. The first parameter may be one or more values retrieved from one or more columns 105 or rows from one or more tables 104 retrieved from database system 102. The second parameter may be a new or existing data operation (e.g., if one is ongoing or is to be instituted across a plurality of object instances). In an embodiment, if no second parameter is provided, converter 108 may operate synchronously (e.g., on an instance-by-instance basis).

The asynchronous converter 108 may execute a conversion process or method that returns future 118 which allows for the subsequent retrieval of the converted property 107 values after values across a number of instances has been collected. Future 118 may be a be a batch part 116 that converter 108 creates and queues for delayed execution.

Batch part 116 may store values from table 104 (e.g., column 105C) and any other information that may be necessary to execute the mapping and calculated value 107C.

In an embodiment, a data operation may provide an interface for queuing batch parts 116. The data operation may also be configured to hold the corresponding batch part queues. For example, a first instance of batch processor 112 may hold or maintain a first batch part queue while a second instance of batch processor 112 may hold or maintain a second batch part queue. At the end of a data operation, the queued batch parts 116 (for a given batch processor 112 instance) are collected as a single list and may be passed together to the batch processor 112 for bulk processing. For example, the list may be passed as a parameter to a batch processor 112 run method. The batch processor 112 may then process the batch parts 112 of the list in bulk. An example data operation method is shown below:

```
try (DataOperation operation = new DataOperation( ))
{
    for(Object_DO object : objects)         {
        object.getAsync("Property107C",operation);
                                            }
}
```

In the example code provided, a data operation or conversion scope may be established with the data operation call (e.g., the try command line). The for command line may define or register the intent to retrieve "Property107C" of object class 106 in the collection or object instances being iterated upon.

Upon the data operation being closed (when we exit the try block in the sample code above), with the data having been collected or identified from one or more tables 104, the batch processor(s) 112, for which requests were collected, actually perform the processing or conversion process. For example, the values read from table 104 may be stored as a single row/object instance and would be passed converter 108 with reference to the running data operation. Converter 108 may then create a batch part 116 for the data operation. The batch part 116, for example, may include the text id retrieved from column 105C.

Converter 108 may then queue the created batch part 116 using the data operation batch method, creating a list of text ids for different object instances. Once the final value has been collected from table 104 or the data operation has otherwise been closed, batch processor 112 may be called by the data operation with the list of all the batch parts 116 created by converter 108. Batch processor 112 may then perform a single query using the text ids accumulated and stored in batch parts 116. Batch processor 112 may then determine a final result set with the values of property 107 that are compared against the conditions of the query 110.

In an embodiment, multiple batch processors 112 may operate sequentially in or using the same thread. For example, the batch processor 112 may query for the set of objects for which requests were queued in the first step (say {object 1, object 2}) and then, using the query result set, are able to derive the individual objects property values 107. The futures 118 corresponding to the property values 107 for each individual object or object instance are then resolved with the values as derived in the previous step.

In an embodiment, batch processor 112 may have two modes of operation depending on whether a single instance or multiple queued instances are being processed. For example, batch processor 112 may be configured such that it may operate on either a synchronous or instance-by-instance basis. An example single instance function all may take the form of: operation.batch(READ_PROCESSOR, read). Or batch processor 112 may operate asynchronously on a multiple instance basis depending on which parameters are passed to batch processor 112. An example multiple instance function call take the form of: READ_PROCESSOR.run (collections.singLeton(read)). If converter 108 (or one or more methods or operations to be performed) are passed as a parameter with a data set, then batch processor 112 may batch the processing of the results as described herein. However, if only data for a single object instance is passed to batch processor 112 (e.g., without a corresponding method), then batch processor 112 may execute converter 108 as described above and return the value for property 107C for the single object instance data received.

FIG. 2A is an example of how query processing is performed without the use of a batch processor 112, according to an embodiment. FIG. 2B is an example of how query processing is performed with the use of a batch processor 112, according to an embodiment.

As described above, columns 105A and 105B may be scalar or simple values that directly correspond to values as they are stored in object class 106. As such, the processing of the values for 105A and 105B may be performed by a single query execution 210A.

However, column 105C may include data that corresponds to a custom object property 107 that requires additional processing, e.g., through the use of converter 108, in order to translate the value(s) as stored in database table 104 into the values as they are stored in the corresponding object field(s) 107C. As shown, in FIG. 2A, multiple queries 220A, 220B, . . . 220N may be performed on each object instance for the values of column 105C (without the use of batch processor 112). Though shown in a single table 104 example, in other embodiments, values for object properties 105 may be stored across multiple tables 104, columns 105, and/or rows.

FIG. 2B, by contrast, shows how batch processor 112 reduces the number of queries or database accessed performed on the same data shown in FIG. 2A. For example, while query 210A may remain the same for the simple values of column 105A and 105B, the number of queries required to process the complex or custom values of column 105C may be reduced from N queries (e.g., in which N corresponds to the number of object instances), to any number less than N, including a single query 230 as shown. As noted above, in processing query 230, batch processor 112 may retrieve the values across the various object instances, convert the values (e.g., using converter 108), compare the batch parts 116 (e.g., converted values) against the query condition(s) to determine zero or more intermediate values 120, and return a result set or future 118.

Figure 3:
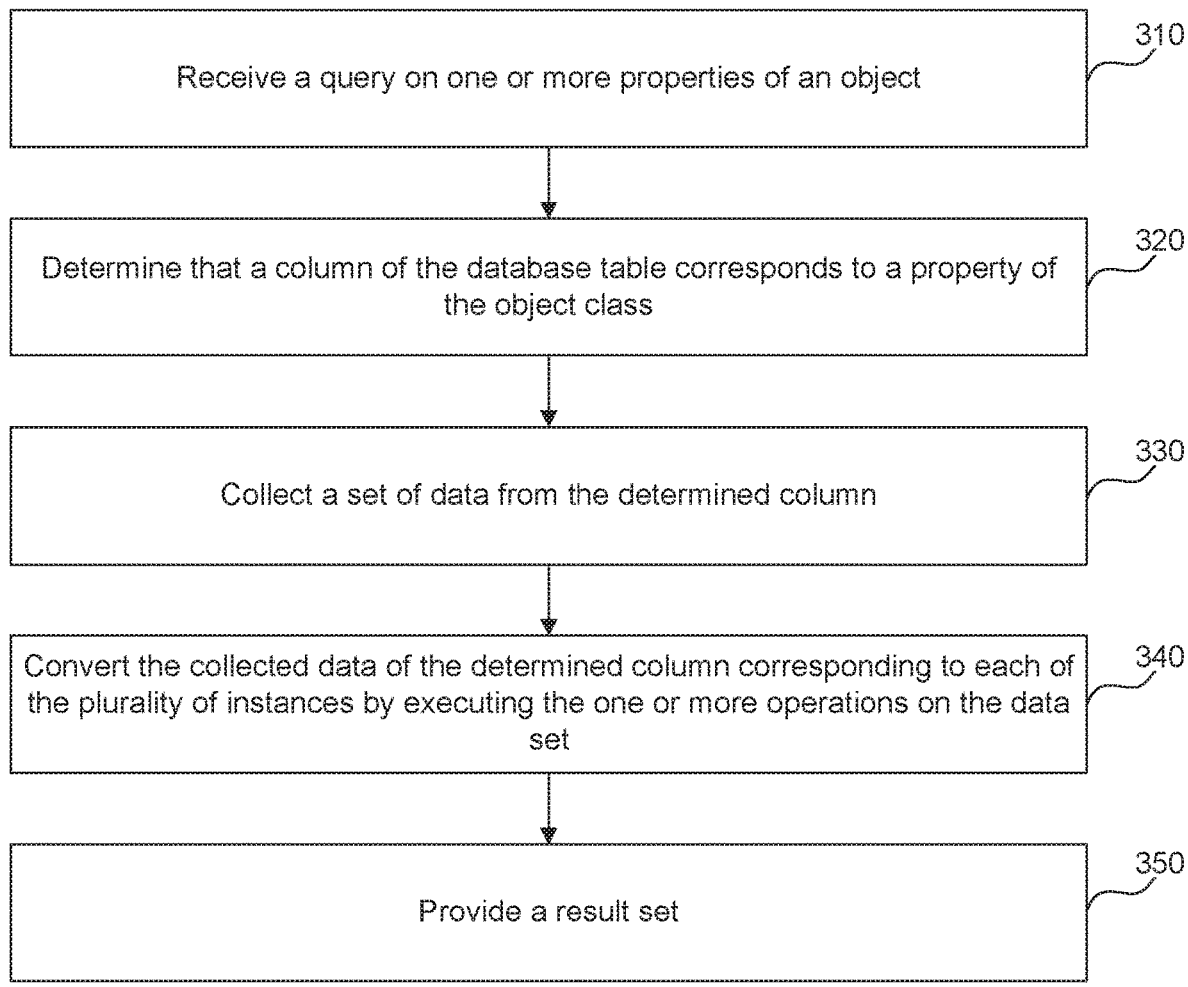
FIG. 3 is a flowchart illustrating a process for bulk processing of object properties, for example custom object properties, according to an example embodiment.

FIG. 3 is a flowchart illustrating a process for the bulk processing of custom object properties, according to an example embodiment. Method 300 can be performed by processing logic that can comprise hardware (e.g., circuitry, dedicated logic, programmable logic, microcode, etc.), software (e.g., instructions executing on a processing device), or a combination thereof. In step 310, a query on one or more properties of an object is received. For example, database system 102 may receive query 110 to determine which instances of object class 106 satisfy the conditions of query 110. In an embodiment, one or more database tables 104 may include data arranged across one or more columns 105 and/or rows corresponding to the values of the queried properties 107 for a plurality of instances of an object class 106 of object oriented environment 111.

In step 320, a column of the database table that corresponds to a property of the object class is determined. For example, columns 105A-C may correspond to properties 107A-C. In the example of FIG. 1, properties 107A and 107B may be simple or scalar values that are stored directly in database table 104 without a conversion or mapping. Property 107C, by contrast, may be a custom or complex data structure that requires a mapping between object class 106 and database table 104 (e.g., because the corresponding value(s) of property 107C as stored in column 105C is stored as one or more scalar values in database 104). The mapping may be performed, defined by, or encapsulated in converter 108. An example mapping may include multiplying the value of column 105C by another value, and based on the outcome of a logical operation, performing a subsequent arithmetic operation on the intermediate value.

In step 330, a set of data is collected from the determined column. For example, batch processor 112 may receive or collected data across multiple of the object instances stored in database table 104 for column 105C that is to be converted. In an embodiment, database system 102 or batch processor 112 may first determine that query 110 includes one or more conditions that require data from column 105C (or value of property 107C) is to be evaluated.

In step 340, the collected data of the determined column corresponding to each of the plurality of the instances is converted by executing one or more operations on the data set. For example, batch processor 112 may receive converter 108 as a parameter or otherwise determine one or more operations that are to be executed against the provided collected data set (e.g., batch part 116). Batch processor 116 may then convert the collected data for the data set across the instance(s) for which data is to be evaluated.

In step 350, a result set is provided. For example, the result set may be a future 118 that includes a corresponding set of values for property 107C for each of the provided data values of property 107C for the object instances to be evaluated for query 110. In an embodiment, batch processor 112 may evaluate the converted data against one or more conditions of query 110 and return only those rows or instances (if any) that satisfy the condition(s) or subset of conditions of query 110.

Figure 4:
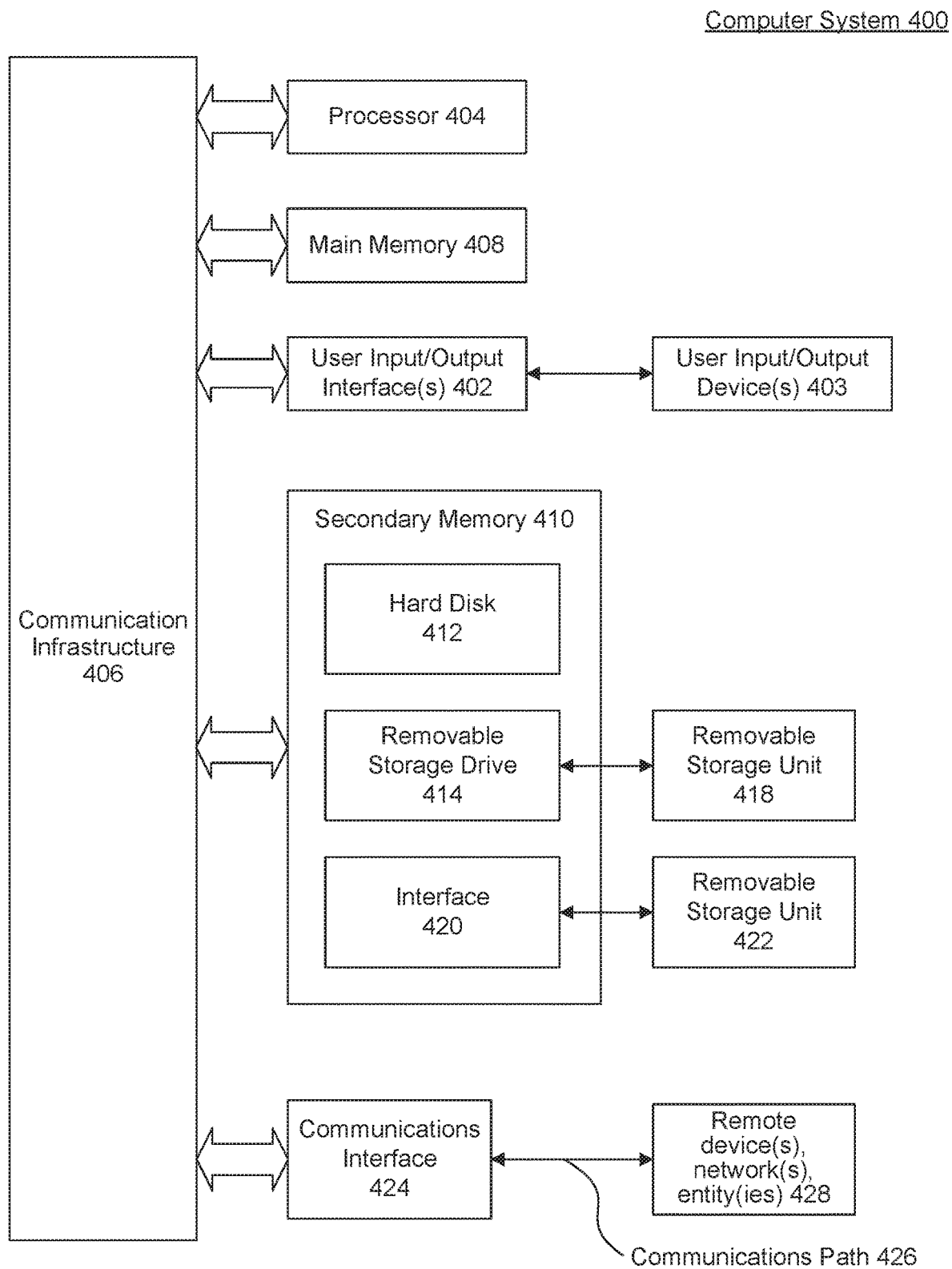
FIG. 4 is an example computer system useful for implementing various embodiments.

Various embodiments can be implemented, for example, using one or more well-known computer systems, such as computer system 400 shown in FIG. 4. Computer system 400 can be any well-known computer capable of performing the functions described herein.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD), optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 4. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method comprising:
    receiving a query on one or more properties of an object class, wherein a database table includes data that corresponds to a plurality of instances of the object class of an object oriented environment;
    determining that a plurality of rows of the database table correspond to a particular one of the properties of the object class, wherein a mapping processor is used to convert data of the plurality of rows to the corresponding data as indicated by the determined property on an instance-by-instance basis by executing one or more operations, including one or more logic or arithmetic operations that convert the column data into one or more values that correspond to a field of the object class;
    collecting a set of data from the determined plurality of rows corresponding to the particular property in a single database query, wherein the data set corresponds to data across a plurality of instances of the object class for which data is stored in a determined column;
    combining the values from the plurality of rows;
    calling one or more methods of the object class;

converting, by the mapping processor, the collected data of the determined column corresponding to each of the plurality of instances by executing the one or more operations on the data set, wherein no value from any of the plurality of rows is returned as a result of the converting for any of the instances until the data of the plurality of rows is converted; and providing a result set including the converted data as it corresponds to the plurality of instances associated with the received query.

2. The method of claim 1, wherein a field of the object class corresponds to another object class of the object oriented environment.

3. The method of claim 1, wherein one or more additional columns of the database correspond to one or more fields of the object class that directly correspond to data of the object class without executing the one or more operations.

4. The method of claim 3, wherein data of one or more fields of the object class that correspond to the one or more additional columns include scalar data.

5. The method of claim 1, wherein the result set comprises a future that is not provided until all of the collected data is converted.

6. The method of claim 1, wherein the determining comprises:
determining that a plurality of columns or plurality or rows of the database table correspond to the field of the object class.

7. The method of claim 1, further comprising:
evaluating the converted data against one or more conditions of the query, wherein the result set comprises only those rows of data that satisfy the query as determined based on the evaluating.

8. The method of claim 1, wherein the received query is associated with the one or more properties of a first instance of the plurality of instances, and wherein the result set includes the collected and converted data across the plurality of instances.

9. The method of claim 1 further comprising:
determining that the plurality of rows corresponding to the particular property comprise a scalar value prior to the converting; and
determining that the converted data comprises a non-scalar value.

10. A system, comprising:
a memory; and
at least one processor coupled to the memory and configured to:
receive a query on one or more properties of an object class, wherein a database table includes data that corresponds to a plurality of instances of the object class of an object oriented environment;
determine that a set of data of the database table corresponds to one of the properties of the object class;
determine that a plurality of rows of the database table correspond to a particular one of the properties of the object class, wherein a mapping processor is used to convert data of the plurality of rows to the corresponding data as indicated by the determined property on an instance-by-instance basis by executing one or more operations, including one or more logic or arithmetic operations that convert the column data into one or more values that correspond to a field of the object class;
collect a set of data from the determined plurality of rows corresponding to the particular property in a single database query, wherein the data set corresponds to data across a plurality of instances of the object class for which data is stored in a determined column;
combine the values from the plurality of rows;
call one or more methods of the object class;
convert the collected data into one or more corresponding field values for the object class for each of the plurality of instances, wherein no value from any of the plurality of rows is returned as a result of the converting for any of the instances until the data of the plurality of rows is converted; and
provide a result set including the converted data as it corresponds to the plurality of instances associated with the received query.

11. The system of claim 10, wherein the field of the object class corresponds to another object class of the object oriented environment.

12. The system of claim 10, wherein one or more additional sets of data of the database correspond to one or more fields of the object class that directly correspond to data of the object class.

13. The system of claim 12, wherein data of one or more fields of the object class that correspond to the one or more additional sets of data include scalar data.

14. The system of claim 10, wherein the result set comprises a future that is not provided until all of the collected data is converted.

15. The system of claim 10, wherein the at least one processor configured to determine a set of data is configured to determine that a plurality of columns or plurality or rows of the database table correspond to the field of the object class.

16. The system of claim 10, wherein the at least one processor further configured to:
evaluate the converted data against one or more conditions of the query, wherein the result set comprises only those rows of data that satisfy the query as determined based on the evaluation.

17. A non-transitory computer-readable device having instructions stored thereon that, when executed by at least one computing device, causes the at least one computing device to perform operations comprising:
receiving a query on one or more properties of an object class, wherein a database table includes data that corresponds to a plurality of instances of the object class of an object oriented environment;
determining that a plurality of rows of the database table correspond to a particular one of the properties of the object class, wherein a mapping processor is used to map data of the plurality of rows to the corresponding data as indicated by the determined property;
receiving a query on data of a database table, wherein the database table includes data that corresponds to a plurality of instances of an object class of an object oriented environment;
determining that a column of the database table corresponds to a field of the object class, wherein a mapping processor is used to convert data of the column to the corresponding data as indicated by the field on an instance-by-instance basis by executing one or more operations, including one or more logic or arithmetic operations that convert the column data into one or more values that correspond to a field of the object class;
collecting a set of data from the determined plurality of rows corresponding to the particular property in a single database query, wherein the data set corresponds to data across a plurality of instances of the object class for which data is stored in a determined column;
combining the values from the plurality of rows;
calling one or more methods of the object class;
converting, by the mapping processor, the collected data of the determined column corresponding to each of the plurality of instances by executing the one or more operations on the data set, wherein no value from any of the plurality of rows is returned as a result of the converting for any of the instances until the data of the plurality of rows is converted; and
providing a result set including the converted data as it corresponds to the plurality of instances associated with the received query.

* * * * *